US011768985B1

(12) United States Patent
Wang et al.

(10) Patent No.: US 11,768,985 B1
(45) Date of Patent: Sep. 26, 2023

(54) AUTOMATED PLATFORM DESIGN TOOL

(71) Applicant: Dell Products L.P., Round Rock, TX (US)

(72) Inventors: Isaac Qin Wang, Austin, TX (US); Yayun Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/726,014

(22) Filed: Apr. 21, 2022

(51) Int. Cl.
*G06F 30/32* (2020.01)
*G06F 111/02* (2020.01)
*G06F 111/20* (2020.01)

(52) U.S. Cl.
CPC .......... *G06F 30/32* (2020.01); *G06F 2111/02* (2020.01); *G06F 2111/20* (2020.01)

(58) Field of Classification Search
CPC .... G06F 2111/02; G06F 30/398; G06F 30/32; G06F 2111/20
See application file for complete search history.

(56) References Cited

U.S. PATENT DOCUMENTS

| 5,950,201 | A * | 9/1999 | Van Huben | G06F 30/00 707/999.102 |
| 7,546,565 | B2 * | 6/2009 | Fenkes | G06F 30/30 716/136 |
| 7,949,990 | B2 * | 5/2011 | Pfeil | G06F 30/00 716/139 |
| 9,147,034 | B1 * | 9/2015 | Hawkins | G06F 30/398 |
| 10,073,942 | B1 * | 9/2018 | Ginetti | G06F 30/392 |
| 10,210,299 | B1 * | 2/2019 | Ginetti | G06F 30/392 |
| 10,783,296 | B1 * | 9/2020 | Ershov | G06F 30/327 |
| 11,630,933 | B2 * | 4/2023 | Yamane | G06F 30/398 716/100 |
| 11,631,893 | B2 * | 4/2023 | Rogojina | H01M 10/0565 429/231.8 |

(Continued)

OTHER PUBLICATIONS

Jose, Tony, OrCAD™ Design, available at https://magnima.com/blogs/orcad-design/ (last accessed Apr. 21, 2022), Nov. 20, 2017.

*Primary Examiner* — Nha T Nguyen
(74) *Attorney, Agent, or Firm* — Ryan, Mason & Lewis, LLP

(57) ABSTRACT

Methods, apparatus, and processor-readable storage media for an automated platform design tool are provided herein. An example method includes extracting information from a first file corresponding to a first computing design, the information including an identifier of at least one network, components associated with the identifier, and connections for each of the components; comparing the first computing design to a second computing design, wherein the comparing comprises: detecting that a second schematic file corresponding to the second computing design comprises the identifier, and determining, for at least one given component, whether the second schematic file includes a matching component based on the set of connections for the at least one given component; determining differences between the first computing design and the second computing design based on the results of the comparing; and initiating at least one automated action based at least in part on the one or more differences.

20 Claims, 6 Drawing Sheets

(56) References Cited

U.S. PATENT DOCUMENTS

| | | | | |
|---|---|---|---|---|
| 2003/0123724 A1* | 7/2003 | McClelland | ............ | G06T 11/001 |
| | | | | 382/165 |
| 2005/0091627 A1* | 4/2005 | Satapathy | ............... | G06F 30/39 |
| | | | | 716/102 |
| 2007/0157140 A1* | 7/2007 | Holesovsky | ............ | G06F 30/398 |
| | | | | 716/112 |
| 2008/0172640 A1* | 7/2008 | Fenkes | ..................... | G06F 30/30 |
| | | | | 716/51 |
| 2008/0288907 A1* | 11/2008 | Laing | ....................... | G06F 30/30 |
| | | | | 716/103 |
| 2011/0107281 A1* | 5/2011 | Sun | ........................ | G06F 30/398 |
| | | | | 716/139 |
| 2014/0282326 A1* | 9/2014 | Chen | ..................... | G06F 30/398 |
| | | | | 716/111 |
| 2015/0007124 A1* | 1/2015 | Krasnicki | ................ | G06F 30/367 |
| | | | | 716/136 |
| 2017/0124235 A1* | 5/2017 | Ferguson | ................ | G06F 30/30 |
| 2017/0344685 A1* | 11/2017 | Ganzhorn | ............... | G06F 30/34 |
| 2019/0278745 A1* | 9/2019 | Brockelsby | ........... | G06F 40/205 |

* cited by examiner

AUTOMATED PLATFORM DESIGN TOOL

FIELD

The field relates generally to information processing systems, and more particularly to providing schematic design techniques in such systems.

BACKGROUND

Computing platforms are often designed by creating schematic files with design software. The schematic files are often created by different teams and/or original design manufactures (ODMs). Accordingly, each schematic file can have a different "look and feel" and/or use different naming conventions (e.g., due to different component libraries), thereby making it more difficult to ensure consistency between different designs across a particular product line, for example.

SUMMARY

Illustrative embodiments of the disclosure provide techniques for an automated platform design tool. An exemplary computer-implemented method includes: extracting information from a first schematic file corresponding to a first computing design, wherein the information comprises: at least one identifier of at least one network in the first computing design, a set of components associated with the at least one identifier, and a set of connections for each component in the set; comparing the first computing design to a second computing design, wherein the comparing comprises: detecting that a second schematic file corresponding to the second computing design comprises the at least one identifier, and determining, for at least one given component in the set of components, whether the second schematic file comprises a component associated with the at least one identifier that matches the at least one given component, wherein the determining is based at least in part on the set of connections for the at least one given component; determining one or more differences between the first computing design and the second computing design based on the results of the comparing; and initiating at least one automated action based at least in part on the one or more differences.

Illustrative embodiments can provide significant advantages relative to conventional platform design tools. For example, technical problems associated with evaluating platform designs are overcome in one or more embodiments by building a node network database based on schematic design files related to interconnected components of platform designs and using the node network database to automatically identify differences between the platform designs.

These and other illustrative embodiments described herein include, without limitation, methods, apparatus, systems, and computer program products comprising processor-readable storage media.

DETAILED DESCRIPTION

Figure 1:
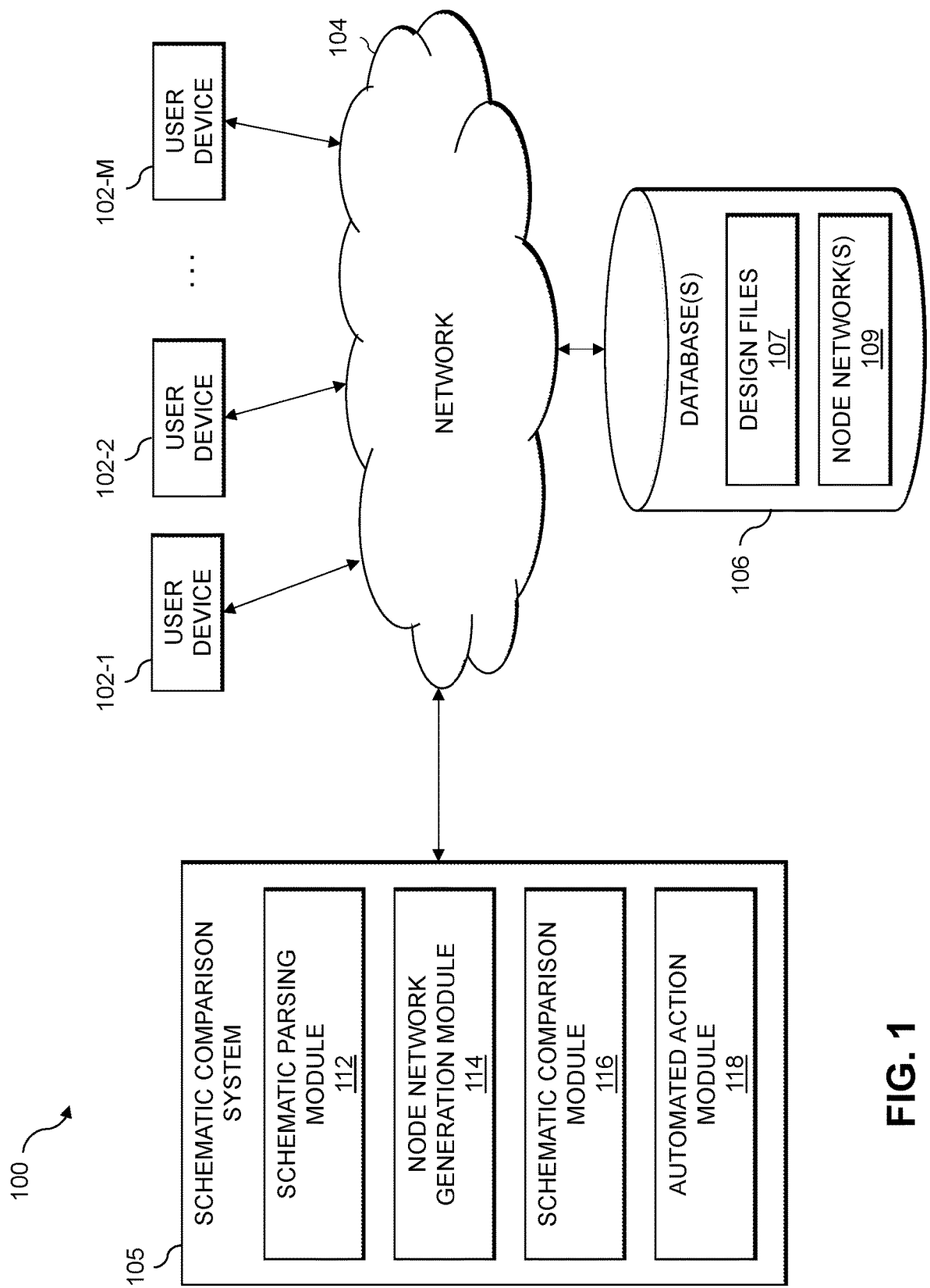
FIG. 1 shows an information processing system configured for providing an automated platform design tool in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Multiple ODMs are often involved in platform development, and platform designs from the same product line may be handled by different teams. As an example, the platform designs may be designed based on different product cost categories (e.g., value, midrange, and expensive) and/or types of product markets (e.g., consumer and business), but may include some common characteristics (e.g., to ensure consistency across the product line).

The design software used to create the platform designs typically uses netlists. The term "netlist" in this context and elsewhere herein is intended to be broadly construed so as to encompass, for example, data describing the platform design. A netlist generally includes data pertaining to logic, connections between components, and hierarchical relationships of the platform design. For example, a netlist may include a list of two or more interconnected components and a list of nodes they are connected to, as well as one or more attributes of the components involved.

Identifying differences between platform designs is often challenging. Conventional techniques generally include manually reviewing and verifying such designs. For example, a user can open two schematic design files side-by-side and visually identify any differences between the files. The differences can correspond to device connections, network names (also referred to herein as net names), component values, package sizes, tolerances, and other critical attributes, for example. In some instances, a given component in two schematic files for a particular design can be placed on different pages and/or can have different attributes, which makes the comparison even more difficult. Although some platform design tools exist, such tools generally require the schematic design files to be created using the same component library and the same reference designator annotation.

Illustrative embodiments of the present disclosure provide techniques that can efficiently compare platform designs. Some embodiments include an automated process that compares schematic design files. The schematic design files may correspond to the same platform design or different platform designs. The automated process, in at least some embodiments, does not depend on conventional reference designator annotation or a number of power and/or ground symbols used in a given design. The automated process also does not depend, or only minimally depends, on the component libraries used by different ODMs. In one such embodiment, the process can compare components (e.g., resistors, capacitors, inductors, transistors, integrated circuits (ICs), and/or connectors) of a given platform design and identify differences in component package, value, tolerance, derating, and/or device pinouts.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a schematic comparison system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the schematic comparison system 105 can have at least one associated database 106 configured to store data pertaining to, for example, one or more design files 107 and/or one or more node networks 109. For example, the one or more design files 107 may include schematic design files uploaded by one or more of the user devices 102, and the one or more node networks 109 may be generated based on the one or more design files 107, as described in more detail elsewhere herein. Optionally, at least one of the design files 107 may correspond to an ODM file.

An example database 106, such as depicted in the present embodiment, can be implemented using one or more storage systems associated with the schematic comparison system 105 and/or user devices 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the schematic comparison system 105 are one or more input-output devices, which illustratively comprise keyboards, displays or other types of input-output devices in any combination. Such input-output devices can be used, for example, to support one or more user interfaces to the schematic comparison system 105, as well as to support communication between the schematic comparison system 105 and other related systems and devices not explicitly shown.

Additionally, the schematic comparison system 105 in the FIG. 1 embodiment is assumed to be implemented using at least one processing device. Each such processing device generally comprises at least one processor and an associated memory, and implements one or more functional modules for controlling certain features of the schematic comparison system 105.

More particularly, the schematic comparison system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the schematic comparison system 105 to communicate over the network 104 with the user devices 102, and illustratively comprises one or more conventional transceivers.

The schematic comparison system 105 further comprises a schematic parsing module 112, a node network generation module 114, a schematic comparison module 116, and an automated action module 118. Generally, the schematic parsing module 112 parses two or more of the design files 107 to extract information associated with, for example, networks within the design files 107 and components associated with the networks. It is noted that the term "network" in the context of schematic design files generally refers to two or more interconnected components associated with a given platform design.

In some embodiments, this information can be extracted using one or more regular expressions.

The node network generation module 114 uses the parsed information from the schematic parsing module 112 to build a corresponding node network database, which can be stored as one of the node networks 109 in the at least one database 106, for example.

The schematic comparison module 116 applies a comparison algorithm to identify differences between the two or more of the design files 107 based on the corresponding node network database. One example of a comparison algorithm is described in more detail with reference to FIG. 3. The automated action module 118 initiates one or more automated actions based on the results of the comparison, as discussed in more detail elsewhere herein.

It is to be appreciated that this particular arrangement of modules 112, 114, 116, and 118 illustrated in the schematic comparison system 105 of the FIG. 1 embodiment is presented by way of example only, and alternative arrangements can be used in other embodiments. For example, the functionality associated with the modules 112, 114, 116, and 118 in other embodiments can be combined into a single module, or separated across a larger number of modules. As another example, multiple distinct processors can be used to implement different ones of the modules 112, 114, 116, and 118 or portions thereof.

At least portions of modules 112, 114, 116, and 118 may be implemented at least in part in the form of software that is stored in memory and executed by a processor.

It is to be understood that the particular set of elements shown in FIG. 1 for the schematic comparison system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the schematic comparison system 105 and database(s) 106 can be on and/or part of the same processing platform. Also, although the schematic comparison system 105 is shown as a separate system in the FIG. 1 embodiment, it is to be appreciated that in other embodiments the schematic comparison system 105 can be implemented at least in part on one or more of the user devices 102, for example.

An exemplary process utilizing modules 112, 114, 116, and 118 of an example schematic comparison system 105 in computer network 100 will be described in more detail with reference, for example, to the flow diagrams of FIGS. 3 and 4.

Figure 2:
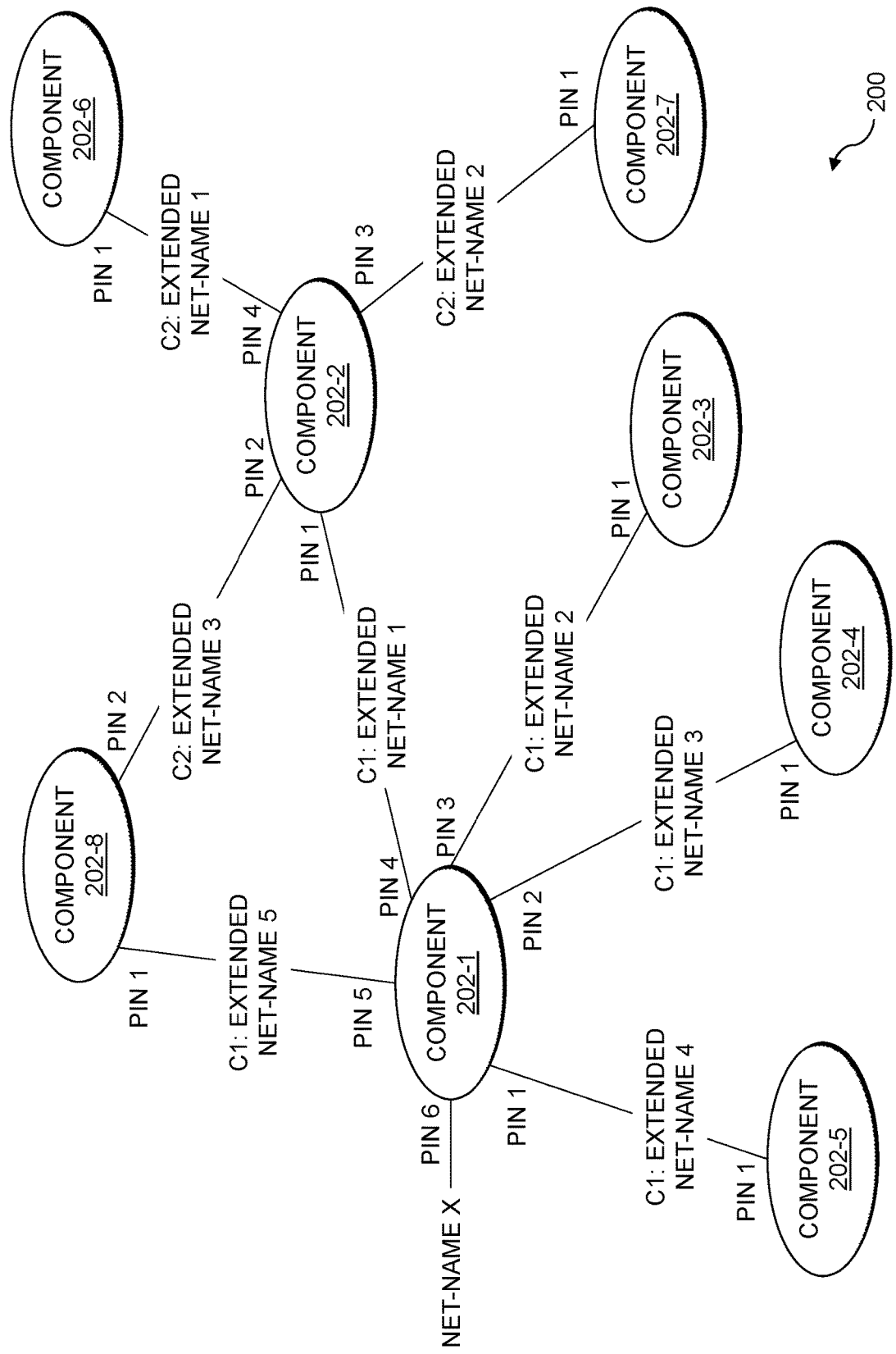
FIG. 2 is a visual representation of a netlist in an illustrative embodiment.

FIG. 2 shows an example of a visual representation of a netlist 200 in an illustrative embodiment. Those skilled in the art will appreciate that the netlist 200 can be included in a schematic design file, for example, and the visual representation of the netlist 200 can be obtained by processing the schematic design file. The representation of the netlist 200 shows the connectivity between components 202-1 through 202-8. For example, component 202-1 includes six pins (labeled pins 1-6). In this example, pin 6 of component 202-1 is connected to a network named net-name x. FIG. 2 also shows five extended networks associated with component 202-1 (named C1: extended net-name 1 to 5, respectively) and three extended networks associated with component 202-2 (named C2: extended net-name 1 to 3, respectively).

Figure 3:
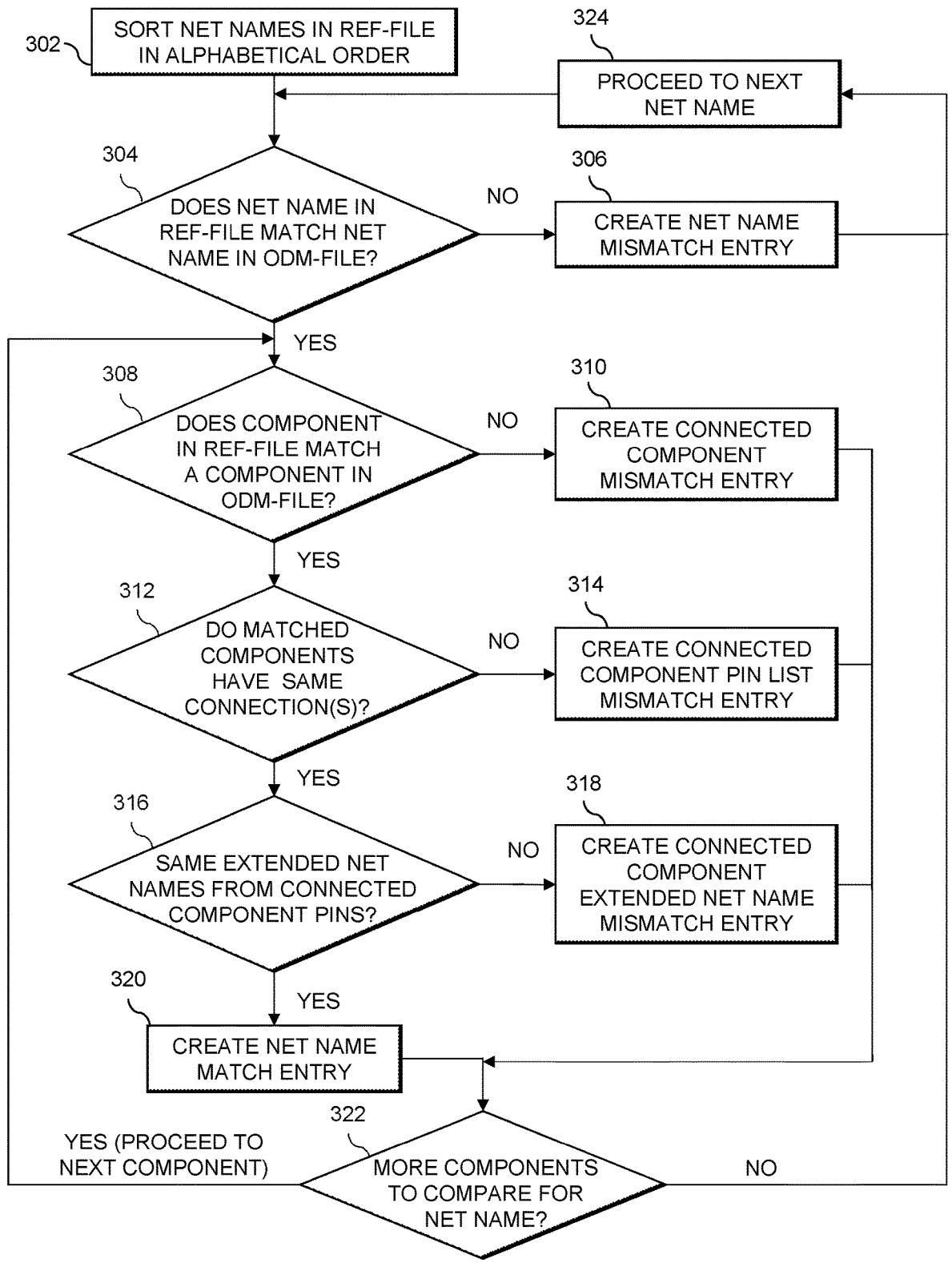
FIG. 3 is a flow diagram of a comparison process in an illustrative embodiment.

FIG. 3 is a flow diagram of a comparison process in an illustrative embodiment. The process, in some embodiments, can be performed at least in part by the schematic comparison module 116 of FIG. 1. It is to be understood that this particular process is only an example, and additional or alternative processes can be carried out in other embodiments.

The process depicted in FIG. 3 assumes two files (referred to as ref-file and ODM-file) have been selected by a user to compare. In some embodiments, the only requirement for the two files is that they have the same network names per signal. Step 302 includes sorting the network names (referred to as net names in FIG. 3) in the ref-file in alphabetical order. Beginning with the first one of the sorted network names from the ref-file, step 304 includes checking whether the network name from the ref-file matches one of the network names associated with the ODM-file. If no, then step 306 is performed, which includes creating a network name mismatch entry. Step 324 includes proceeding to the next network name from the sorted list, and then the process returns to step 304. The process ends if all of the network names in the sorted list have been checked.

If the result of step 304 is yes, then step 308 is performed. Step 308 includes checking whether a given component that is associated with the network name in the ref-file matches one of the components that is associated with the same network name in the ODM-file. For example, step 308 may include comparing the given component to each component in the ODM-file that has the same network name until a match is found or until all of the components in the ODM-file for the network name have been compared. If the result of step 308 is no, then the process continues to step 310; otherwise, the process continues to step 312. Step 310 includes creating a connected component mismatch entry. The process then proceeds to step 322, which checks whether there are more components for the network name in the ref-file that need to be compared. If yes, then step 308 is performed for the next component. If no, then the process proceeds to step 324.

Step 312 includes checking whether the matched components from step 308 have the same connections. As an example, if a signal is connected to pin 1 of the component in the ref-file and the same signal is also connected to pin 1 of the matching component in the ODM-file, then these connections would be considered the same at step 312. However, if the signal is connected to pin 1 of the component in the ref-file and the same signal is connected to pin 3 of the matching component in the ODM-file, then step 312 determines the connections are different.

If the result of step 312 is no, then the process continues to step 314; otherwise, the process continues to step 316. Step 314 includes creating a connected component pin list mismatch entry. The process then proceeds to step 322.

Step 316 includes checking whether the extended network names associated with each of the pins of the component from the ref-file are the same as the extended network names associated with each of the pins in the matching component from the ODM-file. If no, then step 318 is performed which creates a connected component extended network name mismatch entry. The process then proceeds to step 322.

If the result of step 316 is yes, then step 320 is performed, which includes creating a network name match entry. The process then proceeds to step 322. The process ends when all of the network names from the ref-file have been checked.

By way of example, assume that the ref-file referenced in FIG. 3 corresponds to the netlist 200 depicted in FIG. 2. If the ODM-file also includes a network named net-name x, then the process continues to step 308 to compare component 202-1 to components in the ODM-file that are also connected to the network named net-name x. If a component in the ODM-file is found, then step 312 checks whether net-name x is connected to the same pin of the connected component (pin 6). If so, then step 316 checks whether the matched component from the ODM-file and the component 202-1 are connected to the same extended networks by comparing the extended network names (which in FIG. 2 are C1: extended net-name 1, C1: extended net-name 2, C1: extended net-name 3, C1: extended net-name 4, and C1: extended net-name 5). If so, then step 320 creates an entry that indicates that the component in the ODM-file matches component 202-1.

Accordingly, in some embodiments, components are considered to match when (1) the components have the same set of attribute values and (2) the components have the same set of extended network connections (specifically, when the pins of each component connect to the same set of networks in the two platform designs).

Accordingly, one or more embodiments can create a node network database based on the entries created at steps 306, 310, 314, 318, and 320 of the process FIG. 3. The node network database can be used to identify any differences between the ref-file and the ODM-file. It is noted that the process includes comparing the extended stage connections (e.g., corresponding to the extended network names). More specifically, at each node, the comparison process identifies all destinations that a given network is connected to, and then populates the network node database so that it includes the extended stage pin and connection information. Such an approach allows the conventional annotation of a component (e.g., reference designator annotation) to be ignored, and thus enables different designs to be compared even if the designs do not use the same component library. Consider an example where a 10-pin IC component is annotated as U1 in a reference design and the same 10-pin IC component is annotated as D10 in an ODM design. The comparison process described in conjunction with FIG. 3 can verify that the U1 and D10 components are the same component in response to determining that the ten extended networks are connected in the same way in each design.

Optionally, the comparison process depicted in FIG. 3 can also take into account one or more user inputs that specify whether or not certain attributes (or components) should be treated as the same for the purposes of comparison. As an example, the ref-file may include a 0402 package for a resistor and the ODM-file may include a 0201 package for a resistor. In this example, the user can specify whether or not these packages should be considered the same (or matching) for the purposes of the comparison.

In some embodiments, mismatch entries created at steps 306, 310, 314, and 318 can be logged separately from the entries created at step 320. In such embodiments, the process of FIG. 3 results in a set of matched entry items and a set of mismatched entry items, for example. Optionally, the set of matched entry items and the set of mismatched entry items created by the process in FIG. 3 can be further processed to create one or more visual representations so that a user can identify similarities and/or differences between the designs corresponding to the files.

In at least one embodiment, techniques for an automated platform design tool can be implemented as a part of a web application. As an example, a user (e.g., associated with a given one of the user devices 102) may generate an HTTP request to a website, such as a home page associated with the web application. A web server can transfer the HTTP request to a backend web application, and the website can wait for the user to upload two platform design files that are to be compared. In response to the platform design files being uploaded, the web application begins parsing the files (e.g., via one or more regular expressions) and extracts the platform design information (e.g., networks and components associated with the networks). The web application can then build a node network database based on the extracted information, as described in more detail elsewhere herein.

The platform design files are often large (e.g., comprising thousands or more networks and components). Accordingly, in some embodiments, the web application can improve the speed of the comparison operation by dividing the dataset into multiple chunks. For example, the application can divide the dataset into chunks according to a specified number of networks (e.g., each chunk includes a maximum of 100 networks). In such embodiments, a message broker is notified of incoming tasks corresponding to the chunks. The message broker sends the tasks to a task service to carry out the comparison operations. In some embodiments, the task service creates multiple task workers, which can execute tasks concurrently. When a task is completed, the task service sends the results back to the message broker. The message broker waits for all of the tasks to complete before signaling the web service. When all of the tasks are completed, the web application generates a web-based report for the user with the results.

The web-based report can identify the differences between the platform designs such as by marking or highlighting the names of the components that are different. Optionally, the report may include hyperlinks to pages with detailed information about the components (e.g., part name(s), part number(s), reference designator(s), pin counts, tolerances, and/or other information relevant to the components).

A report may alternatively or additionally include a visual representation of a graph (similar to the visual representation shown in FIG. 2, for example). In such embodiments, the visual representation can include one or more indicators (such as colors, symbols, text, etc.) so that a user can easily identify the differences and/or similarities of the two files. Optionally, the user can interact with the visual representation via a graphical user interface. As an example, the visual representation can initially show all similarities and all differences detected by the process in FIG. 3. The visual representation can then be dynamically updated in response to one or more user inputs, such as by identifying or highlighting only the similarities, only the differences, or one or more specific types of differences or similarities between at least portions of the platform design in the two files (e.g., differences or similarities between networks, components, pins, etc.).

Those skilled in the art will appreciate that, in at least some embodiments, the platform design files may include a device definition file (e.g., pstchip.dat), a netlist file (e.g., pstxnet.dat), and a parts list file (e.g., pstxprt.dat). The parts list file generally includes a list of the components in the schematic, along with its reference designator and device type, and possibly one or more properties for at least some of the parts in the schematic. The device definition file generally includes metadata for a given component. The metadata may include characteristics (e.g., value, tolerance, and package dimensions), logical-to-physical pin mapping, and manufacturer part number associated with the component. The netlist file generally defines the logical connections between components of the platform design. For example, the netlist file can use keywords (e.g., net_name, node_name) to specify the reference designators and pin numbers associated with each network in the schematic.

Figure 4:
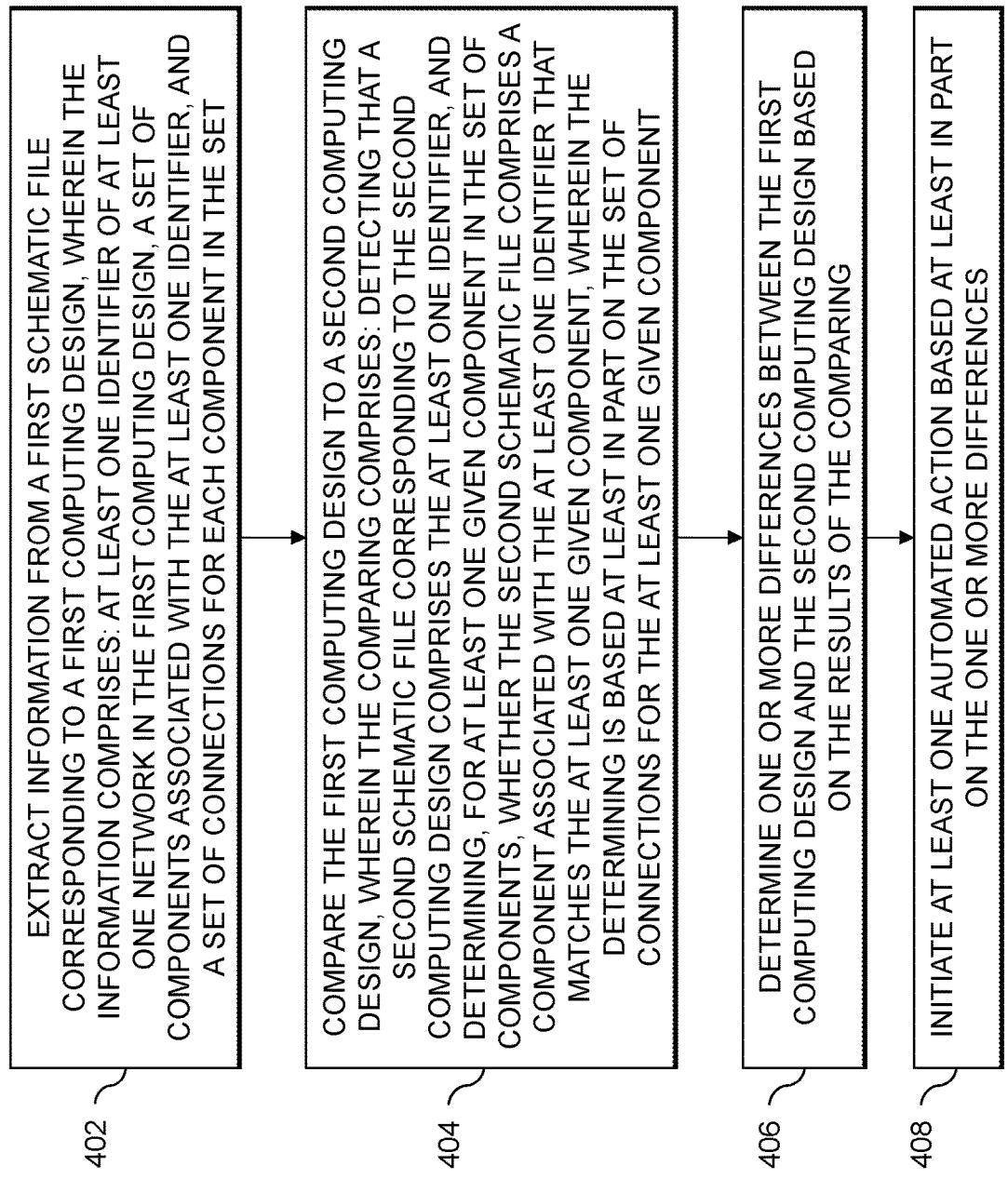
FIG. 4 is a flow diagram of a process for an automated platform design tool in an illustrative embodiment.

FIG. 4 is a flow diagram of a process for an automated platform design tool in an illustrative embodiment. It is to be understood that this particular process is only an example, and additional or alternative processes can be carried out in other embodiments without departing from the scope of this disclosure.

In this embodiment, the process includes steps 402 through 408. These steps are assumed to be performed by the schematic comparison system 105 utilizing its modules 112, 114, 116, and 118.

Step 402 includes extracting information from a first schematic file corresponding to a first computing design, wherein the information comprises: at least one identifier of at least one network in the first computing design, a set of components associated with the at least one identifier, and a set of connections for each component in the set. Step 404 includes comparing the first computing design to a second computing design, wherein the comparing comprises: detecting that a second schematic file corresponding to the second computing design comprises the at least one identifier, and determining, for each given component in the set of components, whether the second schematic file comprises a component associated with the at least one identifier that matches the given component, wherein the determining is based at least in part on the set of connections for the given component. Step 406 includes determining one or more differences between the first computing design and the second computing design based on the results of the comparing. Step 408 includes initiating at least one automated action based at least in part on the one or more differences.

The component associated with the at least one identifier in the second schematic file may match the at least one given component when the component associated with the at least one identifier in the second schematic file and the at least one given component have a same set of attribute values and have a same set of network connections. The set of attribute values may correspond to at least one of: a component value, a package size, a tolerance, a derating, and a pinout. The process in FIG. 4 may include a step of generating a node network database comprising a plurality of entries based on the comparing, wherein each entry in the node network database corresponds to at least one of: one or more portions of the first computing design that match one or more corresponding portions of the second computing design; and one or more portions of the first computing design that are different from one or more portions of the second computing design. The process in FIG. 4 may include a step of generating an entry in the node network database in response to at least one of: determining that the second schematic file does not include the at least one identifier; and determining that the second schematic file does not include a component that matches a given one of the components in the set of components corresponding to the first schematic file. The set of components may include at least one of: one or more resistors; one or more capacitors; one or more inductors; one or more transistors; one or more integrated circuits, and one or more connectors. The information may include a plurality of identifiers for a plurality of networks, and wherein the comparing is performed iteratively for the plurality of networks. The information may include a plurality of identifiers for a plurality of networks, and wherein the comparing is performed concurrently for at least a first portion of the plurality of networks and at least a second portion of the plurality of networks. The extracting may include parsing the first schematic file using one or more regular expressions. The first schematic file and the second schematic file may be uploaded by at least one user. At least one of the first schematic file and the second schematic file may correspond to an ODM file.

The at least one automated action may include at least one of: generating at least one notification corresponding to at least one of the determined differences; generating update information related to at least one of the determined differences, wherein the update information comprises at least one of: one or more part names, one or more part numbers, one or more reference designators, one or more pin counts, and one or more tolerances; automatically traversing a visual representation of one or more of the first schematic file and the second schematic file using a graphical user interface to provide an indication of at least one of the determined differences; and automatically updating one or more portions of one or more of the first and the second schematic files based on at least one of the determined differences. For example, one or more of the first and the second schematic files can be updated according to one or more user preferences related to whether or not certain attributes (or components) should be treated as the same. In at least one embodiment, any updates to the first and/or second schematic file can be presented to a user (e.g., via a graphical user interface) to accept or reject. The at least one automated action may alternatively or additionally include generating a report of the differences.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve platform design comparison tools. These and other embodiments can effectively overcome problems associated with conventional techniques that require designs to use the same library and the same annotated reference designator. For example, one or more embodiments can identify differences between components using a node network database that includes information pertaining to extended stage connections of the components. Additionally, in some embodiments, the design comparison can be divided into multiple parts for concurrent processing, thereby significantly reducing the processing time relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
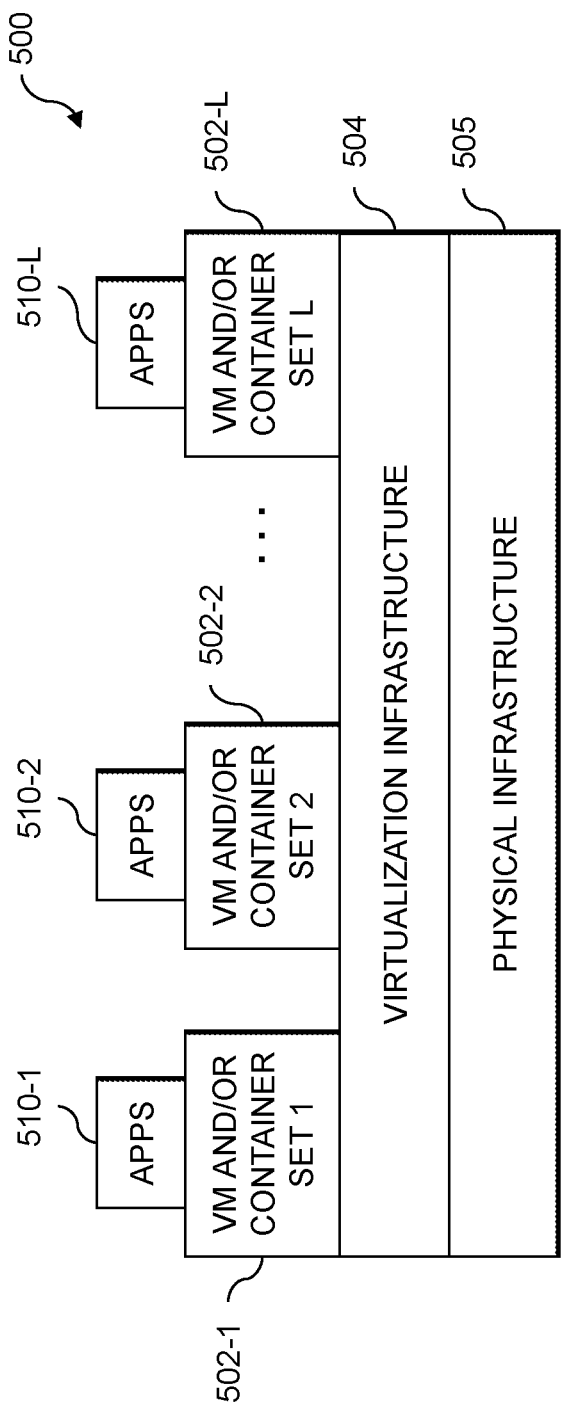
FIGS. 5 and 6 show examples of processing platforms that may be utilized to implement at least a portion of an information processing system in illustrative embodiments.
Figure 6:
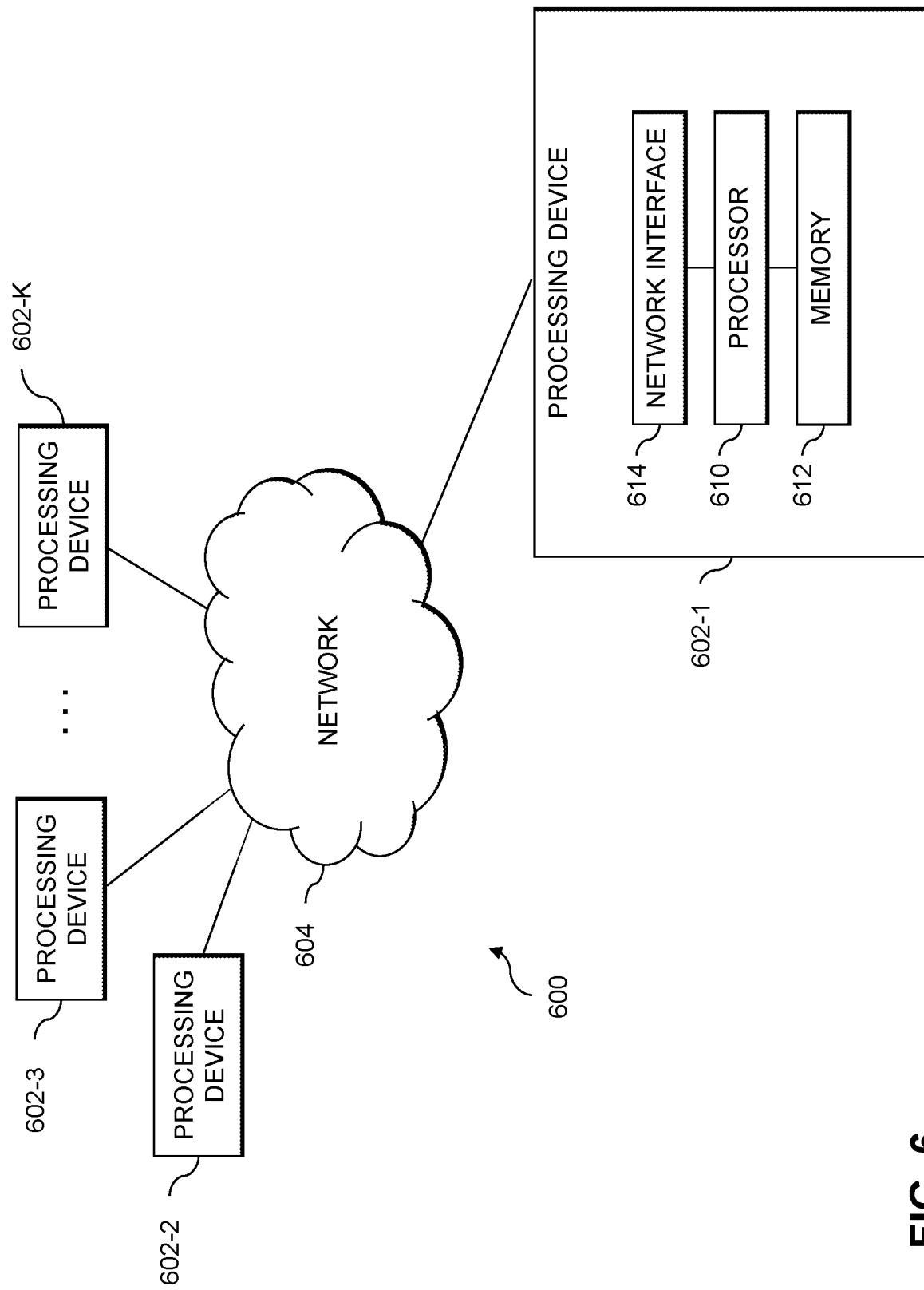

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, an FPGA or other type of processing circuitry, as well as portions or combinations of such circuitry elements. The memory 612 comprises RAM, ROM or other types of memory, in any combination.

The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   extracting information from a first schematic file corresponding to a first computing design, wherein the information comprises: at least one identifier of at least one network in the first computing design, a set of components associated with the at least one identifier, and a set of connections for each component in the set;
   comparing the first computing design to a second computing design, wherein the comparing comprises:
      detecting that a second schematic file corresponding to the second computing design comprises the at least one identifier of the at least one network in the first computing design, and
      determining, for at least one given component in the set of components associated with the at least one identifier, whether the second schematic file comprises a component associated with the at least one identifier that matches the at least one given component, wherein the determining is based at least in part on: (i) the set of connections for the at least one given component and (ii) at least one additional identifier of at least one extended network in the first computing design;
   determining one or more differences between the first computing design and the second computing design based on the results of the comparing; and
   initiating at least one automated action based at least in part on the one or more differences;
   wherein the method is performed by at least one processing device comprising a processor coupled to a memory.

2. The computer-implemented method of claim 1, wherein the component associated with the at least one identifier in the second schematic file matches the at least one given component when the component associated with the at least one identifier in the second schematic file and the at least one given component have a same set of attribute values and have a same set of network connections.

3. The computer-implemented method of claim 2, wherein the set of attribute values corresponds to at least one of: a component value, a package size, a tolerance, a derating, and a pinout.

4. The computer-implemented method of claim 1, further comprising:
   generating a node network database comprising a plurality of entries based on the comparing, wherein each entry in the node network database corresponds to at least one of: one or more portions of the first computing design that match one or more corresponding portions of the second computing design; and one or more portions of the first computing design that are different from one or more portions of the second computing design; and
   generating an entry in the node network database in response to at least one of: determining that the second schematic file does not include the at least one identifier; and determining that the second schematic file does not include a component that matches a given one of the components in the set of components corresponding to the first schematic file.

5. The computer-implemented method of claim 1, wherein the set of components comprises at least one of: one or more resistors; one or more capacitors; one or more inductors; one or more transistors; one or more integrated circuits, and one or more connectors.

6. The computer-implemented method of claim 1, wherein the information comprises a plurality of identifiers for a plurality of networks, and wherein the comparing is performed iteratively for the plurality of networks.

7. The computer-implemented method of claim 1, wherein the information comprises a plurality of identifiers for a plurality of networks, and wherein the comparing is performed concurrently for at least a first portion of the plurality of networks and at least a second portion of the plurality of networks.

8. The computer-implemented method of claim 1, wherein the extracting comprises parsing the first schematic file using one or more regular expressions.

9. The computer-implemented method of claim 1, wherein the first schematic file and the second schematic file are uploaded by at least one user.

10. The computer-implemented method of claim 1, wherein at least one of the first schematic file and the second schematic file corresponds to an original design manufacturer (ODM) file.

11. The computer-implemented method of claim 1, wherein the at least one automated action comprises at least one of:
- generating at least one notification corresponding to at least one of the determined differences;
- generating update information related to at least one of the determined differences, wherein the update information comprises at least one of: one or more part names, one or more part numbers, one or more reference designators, one or more pin counts, and one or more tolerances;
- automatically traversing a visual representation of one or more of the first schematic file and the second schematic file using a graphical user interface to provide an indication of at least one of the determined differences; and
- automatically updating one or more portions of one or more of the first and the second schematic files based on at least one of the determined differences.

12. The computer-implemented method of claim 1, wherein determining whether the second schematic file comprises a component associated with the at least one identifier that matches the at least one given component is further based on at least one set of extended connections corresponding to the at least one extended network in the first computing design.

13. A non-transitory processor-readable storage medium having stored therein program code of one or more software programs, wherein the program code when executed by at least one processing device causes the at least one processing device:
- to extract information from a first schematic file corresponding to a first computing design, wherein the information comprises: at least one identifier of at least one network in the first computing design, a set of components associated with the at least one identifier, and a set of connections for each component in the set;
- to compare the first computing design to a second computing design, wherein the comparing comprises:
  - detecting that a second schematic file corresponding to the second computing design comprises the at least one identifier of the at least one network in the first computing design, and
  - determining, for at least one given component in the set of components associated with the at least one identifier, whether the second schematic file comprises a component associated with the at least one identifier that matches the at least one given component, wherein the determining is based at least in part on: (i) the set of connections for the at least one given component and (ii) at least one additional identifier of at least one extended network in the first computing design;
- to determine one or more differences between the first computing design and the second computing design based on the results of the comparing; and
- to initiate at least one automated action based at least in part on the one or more differences.

14. The non-transitory processor-readable storage medium of claim 13, wherein the component associated with the at least one identifier in the second schematic file matches the at least one given component when the component associated with the at least one identifier and the at least one given component in the second schematic file have a same set of attribute values and have a same set of network connections.

15. The non-transitory processor-readable storage medium of claim 14, wherein the set of attribute values corresponds to at least one of: a component value, a package size, a tolerance, a derating, and a pinout.

16. The non-transitory processor-readable storage medium of claim 13, wherein the at least one processing device is further caused:
- to generate a node network database comprising a plurality of entries based on the comparing, wherein each entry in the node network database corresponds to at least one of: one or more portions of the first computing design that match one or more corresponding portions of the second computing design; and one or more portions of the first computing design that are different from one or more portions of the second computing design.

17. An apparatus comprising:
- at least one processing device comprising a processor coupled to a memory;
- the at least one processing device being configured:
  - to extract information from a first schematic file corresponding to a first computing design, wherein the information comprises: at least one identifier of at least one network in the first computing design, a set of components associated with the at least one identifier, and a set of connections for each component in the set;
  - to compare the first computing design to a second computing design, wherein the comparing comprises:
    - detecting that a second schematic file corresponding to the second computing design comprises the at least one identifier of the at least one network in the first computing design, and
    - determining, for at least one given component in the set of components associated with the at least one identifier, whether the second schematic file comprises a component associated with the at least one identifier that matches the at least one given component, wherein the determining is based at least in part on: (i) the set of connections for the at least one given component and (ii) at least one additional identifier of at least one extended network in the first computing design;
  - to determine one or more differences between the first computing design and the second computing design based on the results of the comparing; and
  - to initiate at least one automated action based at least in part on the one or more differences.

18. The apparatus of claim 17, wherein the component associated with the at least one identifier in the second schematic file matches the at least one given component when the component associated with the at least one identifier in the second schematic file and the at least one given component have a same set of attribute values and have a same set of network connections.

19. The apparatus of claim 18, wherein the set of attribute values correspond to at least one of: a component value, a package size, a tolerance, a derating, and a pinout.

20. The apparatus of claim 17, wherein the at least one processing device is further configured:

to generate a node network database comprising a plurality of entries based on the comparing, wherein each entry in the node network database corresponds to at least one of: one or more portions of the first computing design that match one or more corresponding portions of the second computing design; and one or more portions of the first computing design that are different from one or more portions of the second computing design.

* * * * *